US008620547B2

(12) United States Patent
Monsere et al.

(10) Patent No.: US 8,620,547 B2
(45) Date of Patent: Dec. 31, 2013

(54) METHODS AND SYSTEMS FOR CONTROLLING BRAKING OF A VEHICLE WHEN THE VEHICLE IS STATIONARY

(75) Inventors: Patrick J. Monsere, Highland, MI (US);
Danny Y. Mui, Birmingham, MI (US);
Kevin S. Kidston, New Hudson, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1165 days.

(21) Appl. No.: 12/503,655

(22) Filed: Jul. 15, 2009

(65) Prior Publication Data

US 2011/0015845 A1    Jan. 20, 2011

(51) Int. Cl.
*G06G 7/00*    (2006.01)
*G06F 7/70*    (2006.01)

(52) U.S. Cl.
USPC .................... 701/70; 701/22; 701/78; 701/83

(58) Field of Classification Search
USPC .......................................... 701/22, 70, 78, 83
See application file for complete search history.

(56) References Cited

U.S. PATENT DOCUMENTS

| 5,502,638 | A  | * | 3/1996  | Takenaka ........................ 701/87 |
| 5,819,008 | A  | * | 10/1998 | Asama et al. .................. 700/255 |
| 8,180,545 | B2 | * | 5/2012  | Monsere et al. ................. 701/70 |
| 8,209,100 | B2 | * | 6/2012  | Sin et al. ......................... 701/70 |
| 2002/0198660 | A1 | * | 12/2002 | Lutter et al. ................... 701/301 |
| 2005/0231340 | A1 | * | 10/2005 | Tauchi ........................... 340/435 |
| 2006/0015242 | A1 | * | 1/2006  | Yoshida .......................... 701/96 |
| 2008/0036294 | A1 | * | 2/2008  | Yamamoto et al. ......... 303/116.1 |
| 2008/0147261 | A1 | * | 6/2008  | Ichinose et al. ................. 701/24 |
| 2008/0243323 | A1 | * | 10/2008 | Karnjate et al. ................. 701/22 |
| 2009/0048753 | A1 | * | 2/2009  | Ogawa et al. .................... 701/79 |
| 2010/0106385 | A1 | * | 4/2010  | Ramler et al. ................... 701/70 |

* cited by examiner

*Primary Examiner* — Khoi Tran
*Assistant Examiner* — Jorge Peche
(74) *Attorney, Agent, or Firm* — Ingrassia Fisher & Lorenz, P.C.

(57) ABSTRACT

A method for controlling braking of a vehicle includes the steps of calculating a first pressure based on a driver request, and providing pressure that does not exceed a predetermined pressure threshold if the vehicle is stationary and the first pressure is less than the predetermined pressure threshold.

9 Claims, 2 Drawing Sheets

METHODS AND SYSTEMS FOR CONTROLLING BRAKING OF A VEHICLE WHEN THE VEHICLE IS STATIONARY

TECHNICAL FIELD

The present invention generally relates to the field of vehicles and, more specifically, to methods and systems for controlling braking of vehicles.

BACKGROUND OF THE INVENTION

Automobiles and various other vehicles include braking systems for reducing vehicle speed or bringing the vehicle to a stop. Such braking systems generally include a controller that provides braking pressure to braking calipers of the braking system to produce braking torque for the vehicle. For example, in a hydraulic braking system, hydraulic braking pressure is provided to the braking calipers to produce braking torque for the vehicle. However, excessive braking pressure, such as excessive hydraulic braking pressure, can cause increases in braking drag and energy consumption, pedal feedback, and/or increased hydraulic fluid consumption and pump cycling.

Accordingly, it is desirable to provide an improved method for controlling braking for a vehicle that limits braking pressure of the vehicle when appropriate. It is also desirable to provide an improved system for such controlling of braking for a vehicle that limits braking pressure of the vehicle when appropriate. Furthermore, other desirable features and characteristics of the present invention will be apparent from the subsequent detailed description and the appended claims, taken in conjunction with the accompanying drawings and the foregoing technical field and background.

SUMMARY OF THE INVENTION

In accordance with an exemplary embodiment of the present invention, a method for controlling braking of a vehicle is provided. The method comprises the steps of calculating a first pressure based on a driver request, and providing pressure that does not exceed a predetermined pressure threshold if the vehicle is stationary and the first pressure is less than the predetermined pressure threshold.

In accordance with another exemplary embodiment of the present invention, a method for controlling braking of a vehicle during a braking event is provided. The method comprises the steps of calculating a plurality of pressures during the braking event, each of the plurality of pressures calculated based on a different one of a plurality of driver requests, and providing pressure that does not exceed a predetermined pressure threshold if the vehicle is stationary and any of the plurality of pressures are less than the predetermined pressure threshold.

In accordance with a further exemplary embodiment of the present invention, a system for controlling braking of a vehicle during a braking event is provided. The system comprises a sensor and a processor. The sensor is configured to detect a plurality of driver requests during the braking event. The processor is coupled to the sensor. The processor is configured to at least facilitate calculating a plurality of pressures during the braking event, each of the plurality of pressures calculated based on a different one of the plurality of driver requests, and providing pressure that does not exceed a predetermined pressure threshold if the vehicle is stationary and any of the plurality of pressures are less than the predetermined pressure threshold.

BRIEF DESCRIPTION OF THE DRAWINGS

The present invention will hereinafter be described in conjunction with the following drawing figures, wherein like numerals denote like elements, and wherein.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
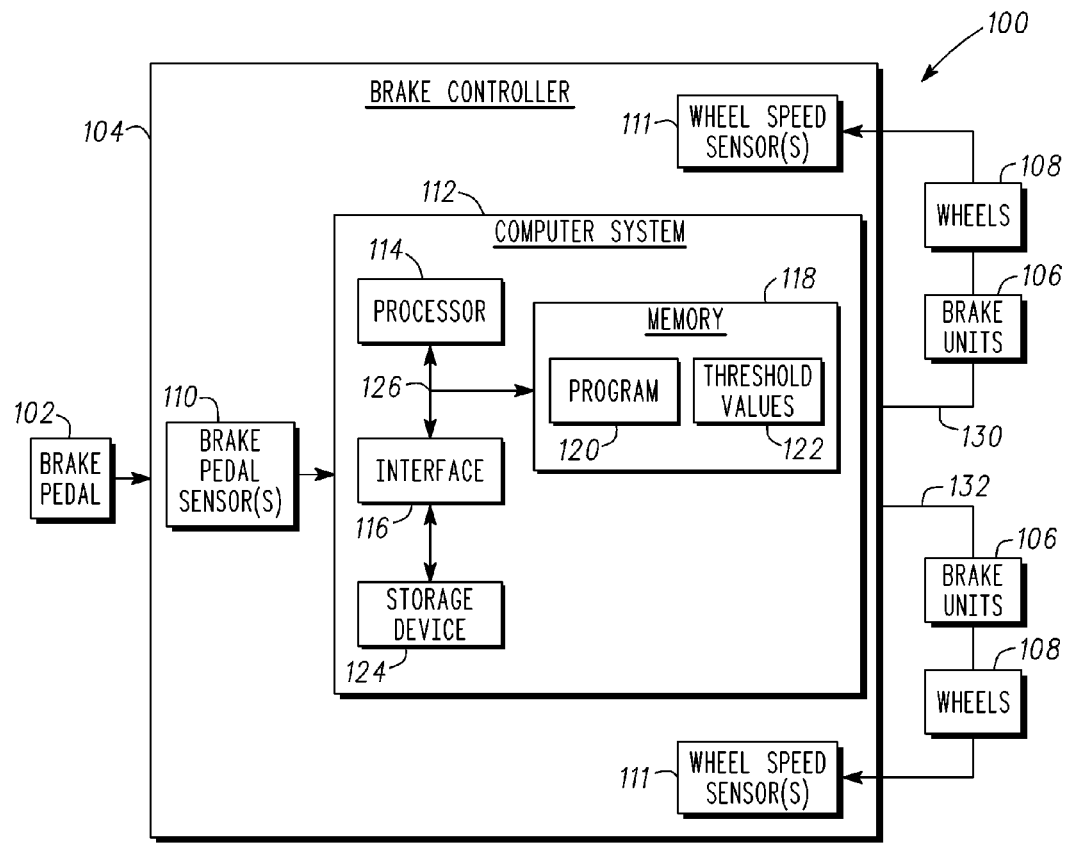
FIG. 1 is a functional block diagram of a braking system for a vehicle, such as an automobile, in accordance with an exemplary embodiment of the present invention.

FIG. 1 is a block diagram of an exemplary braking system 100 for use in a brake-by-wire system of vehicle, such as an automobile. In a preferred embodiment, the vehicle comprises an automobile, such as a sedan, a sport utility vehicle, a van, or a truck. However, the type of vehicle may vary in different embodiments of the present invention.

As depicted in FIG. 1, the braking system 100 includes a brake pedal 102, a brake controller 104, and a plurality of brake units 106. The braking system 100 is used in connection with one or more wheels 108 of the vehicle. In a preferred embodiment, certain of the brake units 106 are disposed along a first axle 130 of the vehicle along with certain of the wheels 108, and certain other of the brake units 106 are disposed along a second axle 132 of the vehicle along with certain other of the wheels 108. In one exemplary embodiment, the first axle 130 is a regenerative braking axle, and the second axle 132 is a non-regenerative braking axle 132. However, this may vary in other embodiments.

The brake pedal 102 provides an interface between an operator of a vehicle and a braking system or a portion thereof, such as the braking system 100, which is used to slow or stop the vehicle. To initiate the braking system 100, an operator would typically use his or her foot to apply a force to the brake pedal 102 to move the brake pedal 102 in a generally downward direction. In one preferred embodiment the braking system 100 is an electro-hydraulic system. In another preferred embodiment, the braking system 100 is a hydraulic system.

The brake controller 104 is coupled between the brake pedal 102, the brake units 106, and the first and second axles 130, 132. Specifically, the brake controller 104 monitors the driver's engagement of the brake pedal 102 and controls braking of the vehicle to limit or conserve braking pressure of the braking system 100 via braking commands sent to the brake units 106 by the brake controller 104 along the first and second axles 130, 132 when appropriate.

In the depicted embodiment, the brake controller 104 comprises one or more brake pedal sensors 110, one or more wheel speed sensors 111, and a computer system 112. In certain embodiments, the brake controller 104 may be separate from the brake pedal sensors 110 and/or the wheel speed sensors 111, among other possible variations. In addition, it will be appreciated that the brake controller 104 may otherwise differ from the embodiment depicted in FIG. 1, for example in that the brake controller 104 may be coupled to or may otherwise utilize one or more remote computer systems and/or other control systems.

The brake pedal sensors 110 are coupled between the brake pedal 102 and the computer system 112. Specifically, in accordance with various preferred embodiments, the brake pedal sensors 110 preferably include one or more brake pedal force sensors and/or one or more brake pedal travel sensors. The number of brake pedal sensors 110 may vary. For example, in certain embodiments, the brake controller 104 may include a single brake pedal sensor 110. In various other embodiments, the brake controller 104 may include any number of brake pedal sensors 110.

The brake pedal travel sensors, if any, of the brake pedal sensors 110 provide an indication of how far the brake pedal 102 has traveled, which is also known as brake pedal travel, when the operator applies force to the brake pedal 102. In one exemplary embodiment, brake pedal travel can be determined by how far an input rod in a brake master cylinder has moved.

The brake pedal force sensors, if any, of the brake pedal sensors 110 determine how much force the operator of braking system 100 is applying to the brake pedal 102, which is also known as brake pedal force. In one exemplary embodiment, such a brake pedal force sensor, if any, may include a hydraulic pressure emulator and/or a pressure transducer, and the brake pedal force can be determined by measuring hydraulic pressure in a master cylinder of the braking system 100.

Regardless of the particular types of brake pedal sensors 110, the brake pedal sensors 110 detect one or more values (such as brake pedal travel and/or brake pedal force) pertaining to the drivers' engagement of the brake pedal 102. The brake pedal sensors 110 also provide signals or information pertaining to the detected values pertaining to the driver's engagement of the brake pedal 102 to the computer system 112 for processing by the computer system 112.

The wheel speed sensors 111 are coupled between one or more of the wheels and the computer system 112. Specifically, the wheel speed sensors 111 detects information pertaining to movement of one or more of the wheels 108, and provide signals or information pertaining thereto to the computer system 112.

In the depicted embodiment, the computer system 112 is coupled between the brake pedal sensors 110, the wheel speed sensors 111, the brake units 106, and the first and second axles 130, 132. The computer system 112 receives the signals or information pertaining to the drivers' engagement of the brake pedal 102 from the brake pedal sensors 110 and the signals or information pertaining to the speed of one or more of the wheels 108. The computer system 112 further processes these signals or information in order to control braking of the vehicle and limit or conserve braking pressure of the braking system 100 via braking commands sent to the brake units 106 by the computer system 112 along the first and second axles 130, 132 when appropriate, for example to reduce braking drag, energy consumption, pedal feedback, hydraulic fluid consumption, and/or pump cycling. In a preferred embodiment, these and other steps are conducted in accordance with the process 200 depicted in FIG. 2 and described further below in connection therewith.

In the depicted embodiment, the computer system 112 includes a processor 114, a memory 118, an interface 116, a storage device 124, and a bus 126. The processor 114 performs the computation and control functions of the computer system 112 and the brake controller 104, and may comprise any type of processor or multiple processors, single integrated circuits such as a microprocessor, or any suitable number of integrated circuit devices and/or circuit boards working in cooperation to accomplish the functions of a processing unit. During operation, the processor 114 executes one or more programs 120 contained within the memory 118 and, as such, controls the general operation of the brake controller 104 and the computer system 112.

The memory 118 can be any type of suitable memory. This would include the various types of dynamic random access memory (DRAM) such as SDRAM, the various types of static RAM (SRAM), and the various types of non-volatile memory (PROM, EPROM, and flash). The bus 126 serves to transmit programs, data, status and other information or signals between the various components of the computer system 112. In a preferred embodiment, the memory 118 stores the above-referenced program 120 along with one or more threshold values 122 that are used in controlling the braking and limiting the braking pressure when appropriate in accordance with the steps of the process 200 depicted in FIG. 2 and described further below in connection therewith.

The interface 116 allows communication to the computer system 112, for example from a system driver and/or another computer system, and can be implemented using any suitable method and apparatus. It can include one or more network interfaces to communicate with other systems or components. The interface 116 may also include one or more network interfaces to communicate with technicians, and/or one or more storage interfaces to connect to storage apparatuses, such as the storage device 124.

The storage device 124 can be any suitable type of storage apparatus, including direct access storage devices such as hard disk drives, flash systems, floppy disk drives and optical disk drives. In one exemplary embodiment, the storage device 124 comprises a program product from which memory 118 can receive a program 120 that executes one or more embodiments of one or more processes of the present invention, such as the process 200 of FIG. 2 or portions thereof. In another exemplary embodiment, the program product may be directly stored in and/or otherwise accessed by the memory 118 and/or a disk such as that referenced below.

The bus 126 can be any suitable physical or logical means of connecting computer systems and components. This includes, but is not limited to, direct hard-wired connections, fiber optics, infrared and wireless bus technologies. During operation, the program 120 is stored in the memory 118 and executed by the processor 114.

It will be appreciated that while this exemplary embodiment is described in the context of a fully functioning computer system, those skilled in the art will recognize that the mechanisms of the present invention are capable of being distributed as a program product in a variety of forms, and that the present invention applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system 112 may also otherwise differ from the embodiment depicted in FIG. 1, for example in that the computer system 112 may be coupled to or may otherwise utilize one or more remote computer systems and/or other control systems.

The brake units 106 are coupled between the brake controller 104 and the wheels 108. In the depicted embodiment, some of the brake units 106 are disposed along the first axle 130 and are coupled to certain wheels 108 on the first axles 130, and other of the brake units 106 are disposed along the second axle 132 and are coupled to other wheels 108 on the second axle 132. The brake units 106 receive the braking commands from the brake controller 104, and are controlled thereby accordingly.

The brake units 106 can include any number of different types of devices that, upon receipt of braking commands, can apply the proper braking torque as received from the brake controller 104. For example, in an electro-hydraulic system, the brake units 106 can comprise an actuator that can generate hydraulic pressure that can cause brake calipers to be applied to a brake disk to induce friction to stop a vehicle. Alternatively, in an electro-mechanical brake-by-wire system, the brake units 106 can comprise a wheel torque-generating device that operates as a vehicle brake. The brake units 106 can also be regenerative braking devices, in which case the brake units 106, when applied, at least facilitate conversion of kinetic energy into electrical energy.

Figure 2:
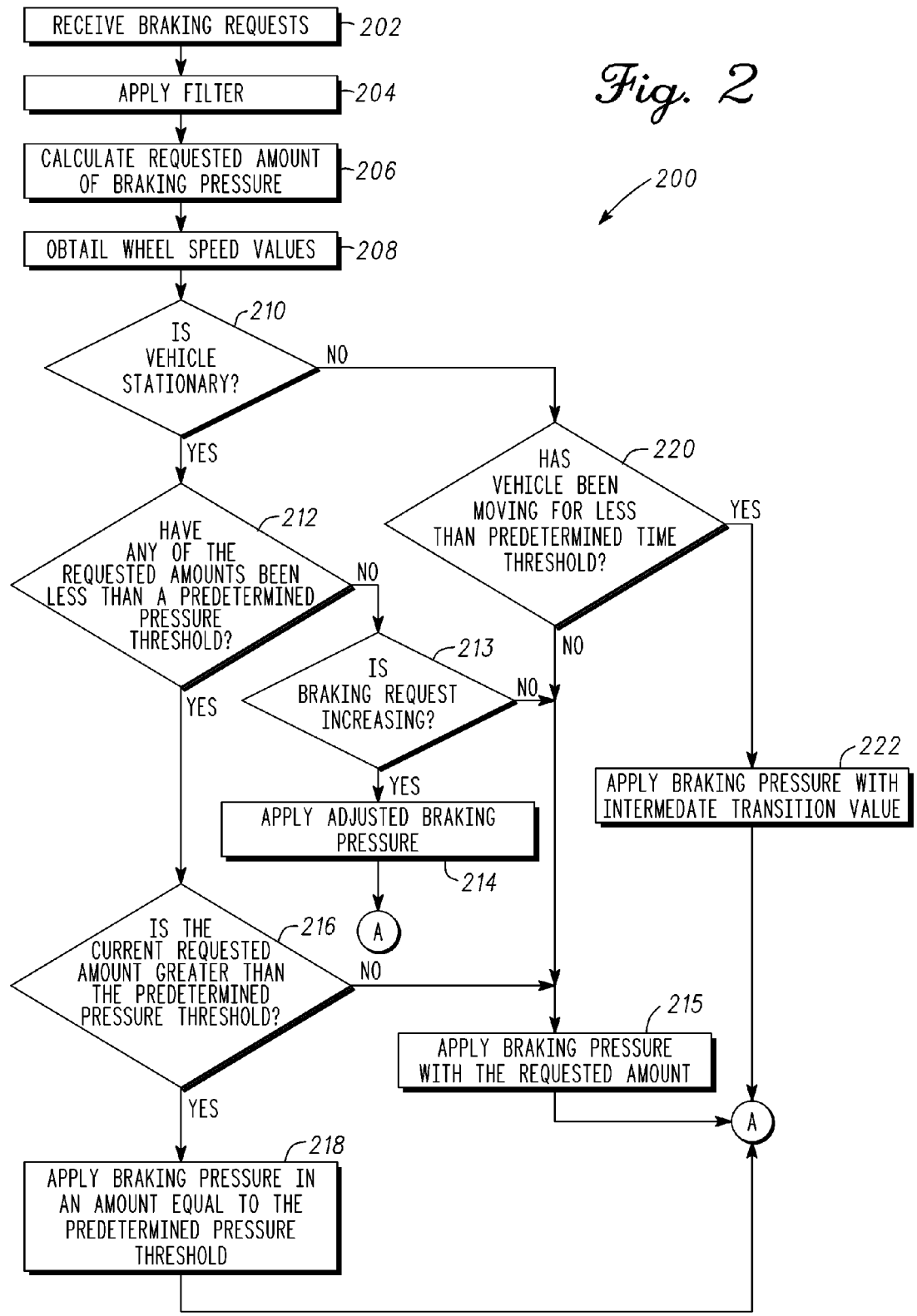
FIG. 2 is a flowchart of a process for controlling braking in a vehicle, such as an automobile, and that can be utilized in connection with the brake controller of FIG. 1, in accordance with an exemplary embodiment of the present invention.

FIG. 2 is a flowchart of a process 200 for controlling braking in a vehicle and for limiting braking pressure when appropriate, in accordance with an exemplary embodiment of the present invention. The process 200 can be implemented in connection with the braking system 100 of FIG. 1, the brake controller 104 and/or the computer system 112 of FIG. 1, and/or program products utilized therewith, in accordance with an exemplary embodiment of the present invention. The process 200 will also be described below in connection with FIG. 3, which depicts a graphical representation 300 of various parameters pertaining to the process 200 in accordance with one exemplary embodiment of the present invention and with operation of the vehicle in one exemplary scenario.

As depicted in FIG. 2, the process 200 begins with the step of receiving one or more braking requests (step 202). The braking requests preferably pertain to values pertaining to engagement of the brake pedal 102 of FIG. 1 by a driver of the vehicle. In certain preferred embodiment, the braking requests pertain to values of brake pedal travel and/or brake pedal force as obtained by the brake pedal sensors 110 of FIG. 1 and provided to the computer system 112 of FIG. 1. Also in a preferred embodiment, the braking requests are received and obtained, preferably continually, at different points or periods in time throughout a braking event for the vehicle.

In certain embodiments, a filter is applied to one or more of the braking requests (step 204). In one preferred embodiment, a first order filter is applied to a corresponding braking request that will be used in controlling braking for the vehicle, such as a most recent braking request. However, this may vary in other embodiments. In a preferred embodiment, the filter, if applied, is applied by the processor 114 of FIG. 1, to thereby generate a filtered braking request.

A requested amount of braking pressure is calculated (step 206). The requested amount of braking pressure preferably corresponds to a certain amount of braking pressure that corresponds to the engagement of the brake pedal 102 by the driver of the vehicle, and that is imputed to the driver as a desired amount of braking pressure based upon the driver's engagement of the brake pedal 102. The requested amount of braking pressure is preferably calculated by the processor 114 of FIG. 1. In one preferred embodiment, the requested amount of braking pressure is calculated using a corresponding, and preferably most recent, braking request directly from step 202. In another preferred embodiment, the requested amount of braking pressure is calculated using a corresponding, and preferably most recent, braking request from step 202 indirectly as filtered during step 204, thereby using the filtered braking request generated in step 204.

In addition, one or more wheel speed values are obtained for the vehicle (step 208). In one preferred embodiment, the wheel speed values are obtained by one or more of the wheel speed sensors 111 of FIG. 1 coupled to one or more of the wheels 108 of FIG. 1 and provided to the processor 114 of FIG. 1 for processing. In another preferred embodiment, the wheel speed values are calculated by the processor 114 of FIG. 1 based on raw data, signals, or other information obtained by one or more of the wheel speed sensors 111 of FIG. 1 and provided to the processor 114 of FIG. 1 for processing.

A determination is made as to whether the vehicle is stationary (step 210). In a preferred embodiment, this determination is made by the processor 114 of FIG. 1 using the wheel speed values obtained during the above-described step 208. However, this may vary in other embodiments. For example, in certain other embodiments, this determination may be made using one or more other techniques, such as the processing of information from a global-positioning system (GPS) device used in connection with the vehicle.

If it is determined in step 210 that the vehicle is stationary, then a determination is made as to whether any of the requested amounts of braking pressure from step 206 thus far during the braking event have been less than a predetermined pressure threshold (step 212). In a preferred embodiment, the predetermined pressure threshold comprises a value of braking pressure that generally would not need to be exceeded while the vehicle is stationary on a smooth and flat surface under typical driving conditions. In certain preferred embodiments, the predetermined pressure threshold is within the range of 10-20 bar of hydraulic pressure. Also in a preferred embodiment, the predetermined pressure threshold is stored in the memory 118 of FIG, 1 as one of the threshold values 122 of FIG. 1. In addition, in a preferred embodiment, the determination of step 212 is made by the processor 114 of FIG. 1.

If it is determined in step 212 that none of the requested amounts of braking pressure from step 206 thus far during the braking event have been less than the predetermined pressure threshold, then a determination is made as to whether the braking request is increasing (step 213). In a preferred embodiment, this comprises a determination as to whether the requested amount of braking pressure from a current time period and a current iteration of step 206 is greater than a corresponding amount of braking pressure from an immediately prior time period and an immediately prior iteration of step 206. Also in a preferred embodiment, this determination is made by the processor 114 of FIG. 1.

If it is determined in step 213 that the braking request is increasing, then an adjusted amount of braking pressure is provided (step 214). In a preferred embodiment, the adjusted amount of braking pressure is equal to a braking pressure applied during an immediately prior time period, so that the braking pressure is applied at a constant rate during this time. Thus, in a preferred embodiment, the amount of braking pressure applied is not allowed to increase during this time until the requested amount of pressure calculated in step 206 is less than the predetermined pressure threshold. In a preferred embodiment, the braking is applied in step 214 with braking pressure provided to the brake units 106 of FIG. 1 based on instructions provided by the processor 114 of FIG. 1.

Conversely, if it is determined in step 213 that the braking request is not increasing, then braking is applied with braking pressure equal to the requested amount of braking pressure calculated in step 206 (step 215). Specifically, in a preferred embodiment, the braking is applied in step 215 with braking pressure provided to the brake units 106 of FIG. 1 based on instructions provided by the processor 114 of FIG. 1, preferably using a corresponding current or most recent value of the requested amount of braking pressure as calculated in a most recent iteration of step 206. As discussed above in connection with step 206, this may or may not reflect a filtered value, depending on whether a filter was applied in step 204. Following step 215, the process preferably returns to step 202, as additional braking requests are received, and the steps of the process 200 continue and repeat throughout the braking event.

Returning now to step 212, if it is determined in step 212 that one or more of the requested amounts of braking pressure from step 206 thus far during the braking event have been less than the predetermined pressure threshold, then a determination is made as to whether a corresponding current or most recent requested amount of braking pressure from a current or most recent iteration of step 206 is greater than the predetermined pressure threshold (step 216). This determination is also preferably made by the processor 114 of FIG. 1.

If a determination is made during step 216 that the corresponding current or most recent requested amount of braking pressure from a current or most recent iteration of step 206 is less than or equal to the predetermined pressure threshold, then the process proceeds to the above-described step 215. As detailed above, during step 215, braking is applied with braking pressure equal to the requested amount of braking pressure calculated in step 206, preferably with braking pressure provided to the brake units 106 of FIG. 1 based on instructions provided by the processor 114 of FIG. 1, preferably using a corresponding current or most recent value of the requested amount of braking pressure as calculated in a most recent iteration of step 206. Also as detailed above, following step 215, the process preferably returns to step 202, as additional braking requests are received, and the steps of the process 200 continue and repeat throughout the braking event.

Conversely, if a determination is made during step 216 that the corresponding current or most recent requested amount of braking pressure from a current or most recent iteration of step 206 is greater than the predetermined pressure threshold, then braking is applied instead with braking pressure equal to the predetermined pressure threshold (step 218). Specifically, in a preferred embodiment, the braking is applied in step 218 with braking pressure provided to the brake units 106 of FIG. 1 based on instructions provided by the processor 114 of FIG. 1, with braking pressure in an amount equal to the predetermined pressure threshold of step 212. Following step 218, the process preferably returns to step 202, as additional braking requests are received, and the steps of the process 200 continue and repeat throughout the braking event.

Returning now to step 210, if it is determined in step 210 that the vehicle is not stationary, then a determination is made as to whether the vehicle has been moving for an amount of time that is less than a predetermined time threshold (step 220). In a preferred embodiment, the predetermined time threshold is stored in the memory 118 of FIG, 1 as one of the threshold values 122 of FIG. 1. Also in a preferred embodiment, the determination of step 220 is made by the processor 114 of FIG. 1. In addition, in a preferred embodiment, this determination is utilized to assess whether or not a transition or rate limiter is needed. For example, if the vehicle was previously stationary and has only recently begun moving, then such a transition or rate limiter is used in a preferred embodiment. In one preferred embodiment, the predetermined time threshold is 250 milliseconds. However, the value of the predetermined time threshold may vary.

If it is determined in step 220 that the vehicle has been moving for an amount of time that is greater than or equal to the predetermined time threshold, then the process proceeds to the above-described step 215. As detailed above, during step 215, braking is applied with braking pressure equal to the requested amount of braking pressure calculated in step 206, preferably with braking pressure provided to the brake units 106 of FIG. 1 based on instructions provided by the processor 114 of FIG. 1, preferably using a corresponding current or most recent value of the requested amount of braking pressure as calculated in a most recent iteration of step 206. Also as detailed above, following step 215, the process preferably returns to step 202, as additional braking requests are received, and the steps of the process 200 continue and repeat throughout the braking event.

Conversely, if it is determined in step 220 that the vehicle has been moving for an amount of time that is less than the predetermined time threshold, then braking is applied with braking pressure equal to an intermediate or transition value (step 222). The intermediate or transition value is preferably greater than the predetermined pressure threshold and less than the corresponding current or most recent requested amount of braking pressure calculated in step 206. Specifically, in a preferred embodiment, when the vehicle was previously stationary but has now just begun moving (i.e., for less than the predetermined time threshold), intermediate or transition values are preferably used during this time to serve as a smooth transition or rate limiter to gradually change from providing braking pressure equal to the predetermined pressure threshold (while the vehicle is stationary) to providing braking pressure equal to the corresponding current or most recent requested amount of braking pressure from step 206 (while the vehicle has been moving for longer than the predetermined amount of time). In one preferred embodiment, a linear transition may be used. However, this may vary in other embodiments.

Also in a preferred embodiment, the braking pressure in step 222 is similarly provided with braking pressure provided to the brake units 106 of FIG. 1 based on instructions provided by the processor 114 of FIG. 1. In addition, in a preferred embodiment, following step 222, the process preferably returns to step 202, as additional braking requests are received, and the steps of the process 200 continue and repeat throughout the braking event.

The process 200 thereby provides limiting of braking pressure under certain appropriate circumstances. Specifically, in accordance with a preferred embodiment, braking pressure is limited to a predetermined clamp value (referenced above as the predetermined pressure threshold) during step 218 when each of the following conditions are satisfied; namely, (i) the vehicle is stationary, (ii) one or more of the requested amounts of braking pressure from step 206 thus far during the braking event have been less than the predetermined pressure threshold, and (iii) the corresponding current or most recent requested amount of braking pressure from the current or more recent iteration of step 206 is greater than the predetermined pressure threshold. During these circumstances, the reduction or clamping of the braking pressure can serve to reduce excessive braking pressure, braking drag, energy consumption, pedal feedback, hydraulic fluid consumption, and/or pump cycling.

Figure 3:
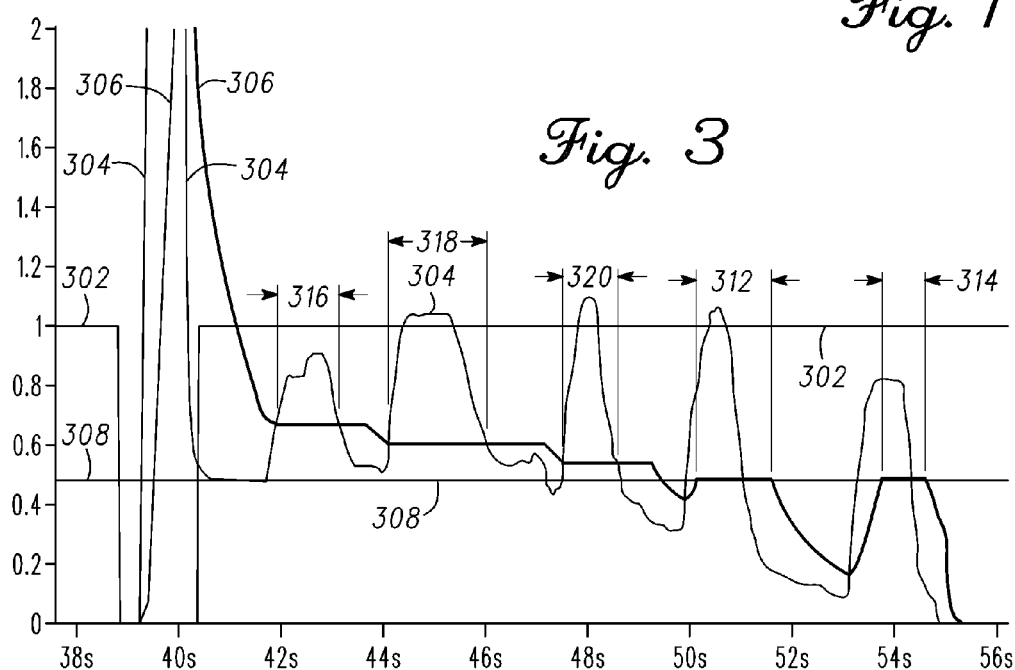
FIG. 3 is a depiction of exemplary graphical representation of various torque parameters pertaining to the brake controller of FIG. 1 and the process of FIG. 2 for an exemplary scenario in which the vehicle is being operated, in accordance with an exemplary embodiment of the present invention.

Turning now to FIG. 3, a graphical representation 300 is provided of various torque parameters pertaining to the brake controller 104 of FIG. 1 and the process 200 of FIG. 2 for an exemplary scenario in which the vehicle is being operated, in accordance with an exemplary embodiment of the present invention. Specifically, the graphical representation 300 of FIG. 1 depicts a wheel speed 302 parameter, an initial driver request 304 parameter, a filtered request 306 parameter, and a clamped value 308 parameter.

The wheel speed 302 of FIG. 3 represents the one or more wheel speed values obtained during step 206 of FIG. 2 by the wheel speed sensors 111 and/or the processor 114 of FIG. 1. The initial driver request 304 of FIG. 3 represents torque values corresponding to the braking requests obtained or receiving during step 202 of FIG. 2 by the brake pedal sensors 110 and/or the processor 114 of FIG. 1 throughout the braking event. The filtered request 306 represents torque values corresponding to the requested amounts of braking pressure calculated during step 206 by the processor 114 of FIG. 1 throughout the braking event in an embodiment in which a first order filter was applied during step 204. The clamped value 308 represents a constant torque value corresponding to the predetermined pressure threshold as applied during step 218 of FIG. 2 based on instructions provided by the processor 114 of FIG. 1.

As shown in FIG. 3, the braking torque is limited to the clamped value 308 during the marked time periods 312 and 215. During the marked time periods 312 and 215 of FIG. 3, each of the above-described conditions of FIG. 2 for limiting pressure are satisfied; namely: (i) the vehicle is stationary, (ii) one or more of the requested amounts of braking pressure from step 206 of FIG. 2 thus far during the braking event have been less than the predetermined pressure threshold, and (iii) the corresponding current or most recent requested amount of braking pressure from the current or more recent iteration of step 206 of FIG. 2 is greater than the predetermined pressure threshold.

In addition, also as shown in FIG. 3, in a preferred embodiment, if the requested amount of braking pressure has not yet dropped below the predetermined threshold and the requested amount of braking pressure is increasing, the braking pressure is held at a constant level during such time periods. This is depicted in regions 316, 318, and 320 in FIG. 3 in accordance with an exemplary embodiment.

Accordingly, improved methods and systems are provided for controlling braking of a vehicle. The improved methods and systems provide for limits on braking pressure in appropriate circumstances when the vehicle is stationary and one or more other conditions are satisfied, to thereby potentially reduce excessive braking pressure, braking drag, energy consumption, pedal feedback, hydraulic fluid consumption, and/or pump cycling.

It will be appreciated that the disclosed methods and systems may vary from those depicted in the Figures and described herein. For example, as mentioned above, the brake controller 104 of FIG. 1 may be disposed in whole or in part in any one or more of a number of different vehicle units, devices, and/or systems. In addition, it will be appreciated that certain steps of the process 200 may vary from those depicted in FIG. 2 and/or described herein in connection therewith. It will similarly be appreciated that certain steps of the process 200 may occur simultaneously or in a different order than that depicted in FIG. 2 and/or described herein in connection therewith. It will similarly be appreciated that the disclosed methods and systems may be implemented and/or utilized in connection with any number of different types of automobiles, sedans, sport utility vehicles, trucks, and/or any of a number of other different types of vehicles, and in controlling any one or more of a number of different types of vehicle infotainment systems.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. A method for controlling braking of a vehicle during a braking event, the method comprising the steps of:
    calculating, via a processor, a plurality of pressures during the braking event, each of the plurality of pressures calculated based on a different one of a plurality of driver requests detected via a sensor; and
    providing, via the processor, pressure equal to a corresponding one of the plurality of pressure values if the vehicle is stationary and any of the plurality of pressures are less than a predetermined pressure threshold; and
    providing, via the processor, pressure equal to the predetermined pressure threshold if the vehicle is stationary and none of the plurality of pressures are less than the predetermined pressure threshold.

2. The method of claim 1, wherein the vehicle has a wheel, and the method further comprises the steps of:
    obtaining a wheel speed value from a wheel speed sensor; and
    determining, via the processor, whether the vehicle is stationary based upon the wheel speed value.

3. The method of claim 1, further comprising the steps of:
    providing, via the processor, pressure equal to an intermediate pressure value that is greater than the predetermined pressure threshold and less than the corresponding one of the pressure values., if each of the following conditions (a)-(b) are satisfied, namely:
        (a) the vehicle is moving, and
        (b) the vehicle has been moving for less than a predetermined amount of time.

4. The method of claim 1, further comprising the step of:
    providing, via the processor, a constant pressure during a time interval, if conditions (a) and (b) are both satisfied:
        (a) the plurality of pressures have each been greater than the predetermined pressure threshold; and
        (b) the plurality of pressures are increasing during the time interval.

5. A system for controlling braking of a vehicle during a braking event, the system comprising:
    a sensor configured to detect a plurality of driver requests during the braking event; and
    a processor coupled to the sensor and configured to at least facilitate:
        calculating a plurality of pressures during the braking event, each of the plurality of pressures calculated based on a different one of the plurality of driver requests; and
        providing pressure equal to a corresponding one of the plurality of pressure values if the vehicle is stationary and any of the plurality of pressures are less than a predetermined pressure threshold; and
        providing pressure equal to the predetermined pressure threshold if the vehicle is stationary and none of the plurality of pressures are less than the predetermined pressure threshold.

6. The system of claim 5, wherein the vehicle has a wheel, and the system further comprises:

a second sensor configured to obtain a wheel speed value, wherein the processor is further configured to determine whether the vehicle is stationary based upon the wheel speed value.

7. The system of claim 5, wherein the processor is further configured to at least facilitate:
   providing a constant pressure during a time interval, if conditions (a) and (b) are both satisfied:
      (a) the plurality of pressures have each been greater than the predetermined pressure threshold; and
      (b) the plurality of pressures are increasing during the time interval.

8. The system of claim 5, wherein the processor is further configured to at least facilitate providing pressure equal to an intermediate pressure value that is greater than the predetermined pressure threshold and less than the corresponding one of the pressure values., if each of the following conditions (a)-(b) are satisfied, namely:
   (a) the vehicle is moving, and
   (b) the vehicle has been moving for less than a predetermined amount of time.

9. The system of claim 8, wherein the processor is further configured to at least facilitate providing pressure equal to the corresponding one of the plurality of pressures if the vehicle has been moving for more than the predetermined amount of time.

* * * * *